F. A. KERNS.
BRAKE.
APPLICATION FILED APR. 4, 1917.
1,256,699.
Patented Feb. 19, 1918.
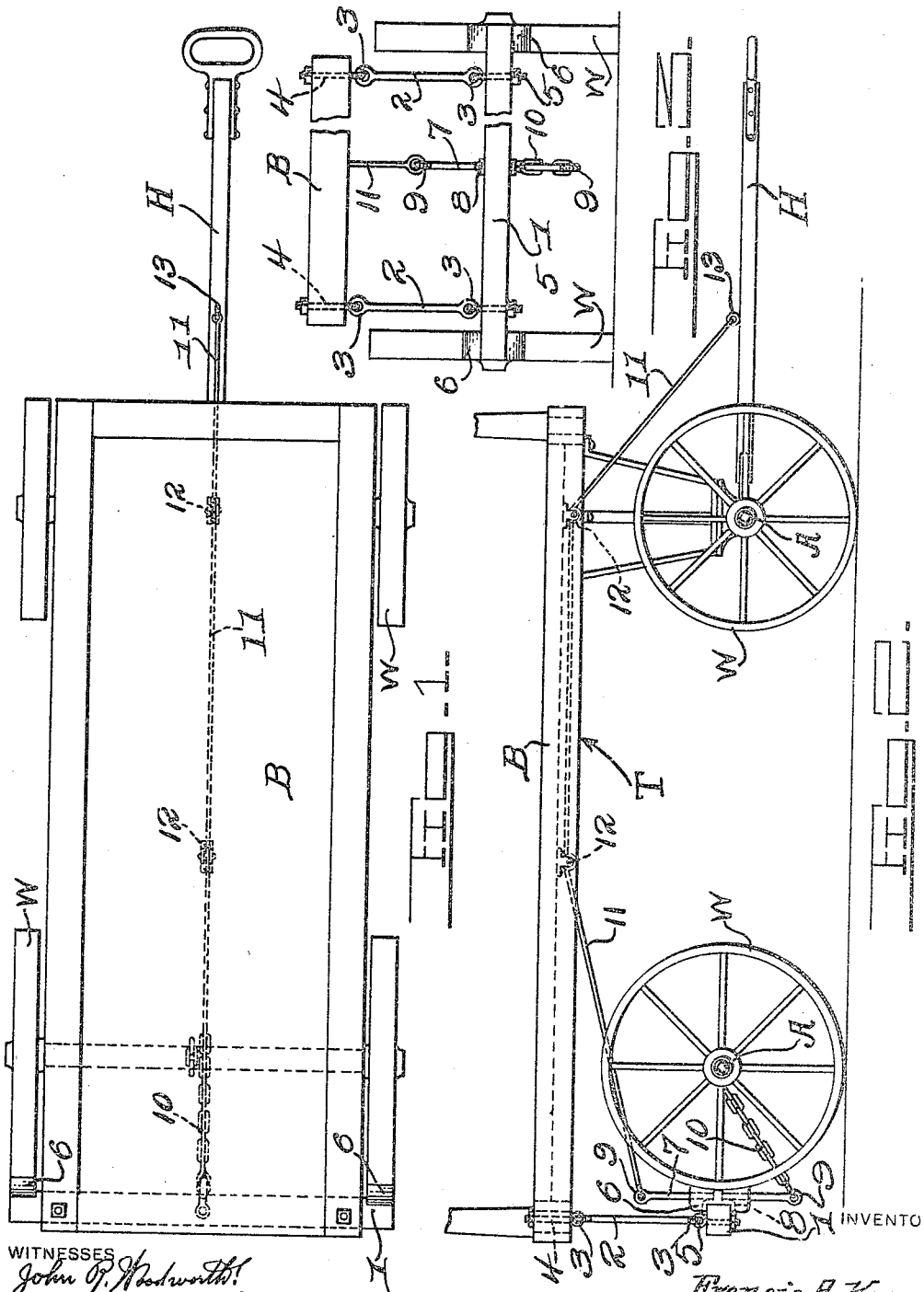
WITNESSES
INVENTOR
Francis A. Kerns.
BY
ATTORNEY

UNITED STATES PATENT OFFICE.

FRANCIS A. KERNS, OF CARROLL, IOWA.

BRAKE.

1,256,699.

Specification of Letters Patent.   Patented Feb. 19, 1918.

Application filed April 4, 1917.   Serial No. 159,713.

*To all whom it may concern:*

Be it known that I, FRANCIS A. KERNS, a citizen of the United States, residing at Carroll, in the county of Carroll and State of Iowa, have invented certain new and useful Improvements in Brakes, of which the following is a specification.

This invention relates to improvements in brakes, and more particularly to brakes for use in connection with hand trucks.

The main object of the invention is to provide a simply constructed and efficient brake of this character so formed and connected as to be automatically applied by the lowering of the truck handle or tongue.

Another object is to provide improved means for mounting the brake beam on the truck.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents a plan view of a hand truck equipped with this improved brake;

Fig. 2 is a side elevation thereof, and

Fig. 3 is a rear elevation with parts broken out for convenience in illustration.

In the embodiment illustrated, a hand truck T of usual construction is shown provided with the ordinary wheels W and body B.

The brake constituting this invention comprises a beam 1 extending transversely of the truck at the rear of the hind wheels W, and which is suspended from the truck body B by means of links 2, two of which are here shown, and each of which has eyes 3 at its opposite ends, the upper eyes of said links being connected with the rear end of the truck body by eye bolts 4 and the lower ends thereof with the brake beam 1, by similar bolts 5.

This beam 1 when so suspended is normally in a plane beyond the plane occupied by the rear wheels W and carries at its opposite ends, brake shoes 6. These brake shoes 6 may be of any suitable or desired construction and are so positioned that when the beam 1 is moved forwardly, they will frictionally engage the peripheries of the hind wheels and exert a braking action thereon. A brake lever 7 is connected with the beam 1, preferably midway its ends by means of a clevis 8. This lever as shown is in the form of a rod having eyes 9 at its opposite ends, the lower eye being connected with the rear axle A of the truck by means of a chain 10, although obviously any other suitable flexible element may be employed for this purpose and which is designed for limiting the outward swinging movement of the brake beam. A flexible element, preferably in the form of a cable 11 is connected with the upper end 9 of the lever 7 and extends under the truck body B passing over small pulleys 12 mounted in suitable hangers carried by the lower face of said body and longitudinally spaced from each other. This cable 11 is connected at its front end with the handle or tongue H of the truck. This handle H is secured to the front axle A in the ordinary manner and the cable 11 may be connected therewith by any suitable means, an eye bolt 13 being here shown for this purpose. This connection is made at a point in advance of the connection of the handle with the axle so that when said handle is lowered, a pull will be exerted on the cable 11 and thereby automatically apply the brake, causing lever 7 to move forwardly, carrying with it beam 1, and thereby bringing the shoes 6 into braking engagement with the rear wheels of the truck. It will of course be understood that the raising of this handle H will relieve the tension on the cable 11 and permit the brake beam the shoes carried thereby, to swing outwardly away from the hind wheels, owing to its loose connection with the eye bolts 4 carried by the body B.

With a brake constructed in the manner above described, no carelessness on the part of the user can operate to prevent the application of the brakes, as immediately the handle H is released it will drop downwardly by its own weight and thereby exert a forward pull on cable 11 and apply the brake in the manner above described, and immediately this handle is raised, the brake will be released.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:

1. The combination with a vehicle having a wheel supported body, a brake beam arranged transversely of said vehicle at the rear of the hind wheels thereof and normally spaced therefrom and carrying brake shoes, links loosely connected at one end with said beam and at their other ends with said body, a lever engaged with said beam intermediately of its ends and midway the length of the beam, a chain connecting the lower end of said lever with the rear axle of said vehicle, longitudinally spaced pulleys depending from the lower face of the body of said vehicle, and a cable connected at one end with the upper end of said lever and at its other end with said tongue whereby the lowering of the tongue will operate to apply the brake.

2. The combination with a wheel supported vehicle having a vertically movable tongue and including a body, eye bolts extending through said body at the rear thereof, links having eyes at their opposite ends, the eyes at one end of said links being engaged with said eye bolts, a brake beam extending transversely of said vehicle at the rear of the hind wheels thereof and provided with brake shoes positioned to engage said wheels when the beam is brought into operation, eye bolts extending through said beam and engaged with the eyes at the lower ends of said links, a brake lever, a clevis connecting said lever to said beam intermediately of the ends of said lever and midway the length of said beam, a chain connecting the lower end of said lever with the rear axle of said vehicle, and a cable connected with the upper end of said lever and at its other end with said tongue in advance of its connection with the vehicle, whereby the lowering of the tongue will operate to apply the brake.

In testimony whereof I affix my signature in presence of two witnesses.

FRANCIS A. KERNS.

Witnesses:
W. R. LEE,
E. McGOWAN.

Copies of this patent may be obtained for five cents each, by addressing the "Commissioner of Patents, Washington, D. C."